May 7, 1940.  R. DAUB  2,199,619
COMPOSITE CYLINDER AND HEAD
Filed Aug. 25, 1938  2 Sheets-Sheet 1
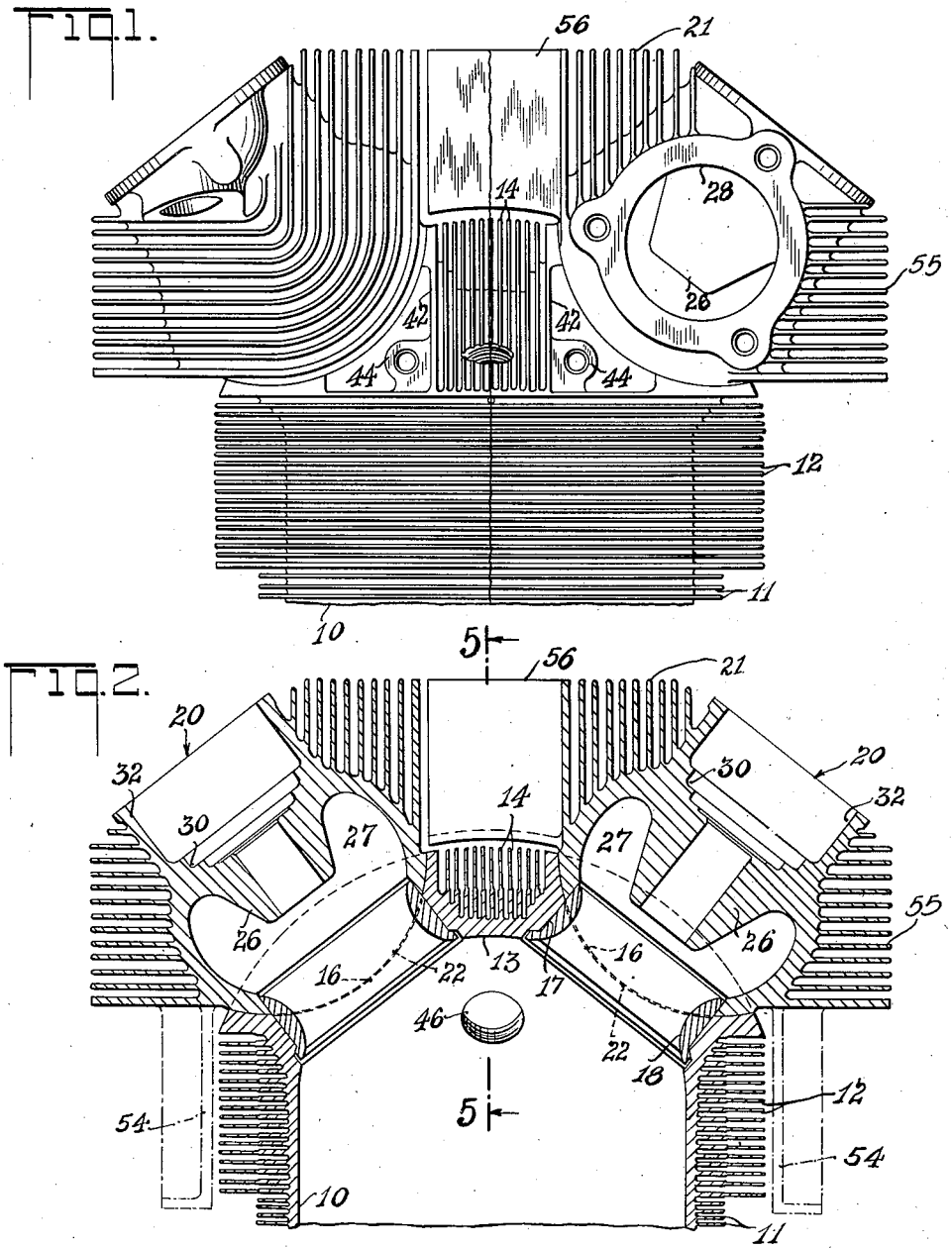
INVENTOR
RUDOLPH DAUB
BY
ATTORNEY May 7, 1940. R. DAUB 2,199,619
COMPOSITE CYLINDER AND HEAD
Filed Aug. 25, 1938 2 Sheets-Sheet 2
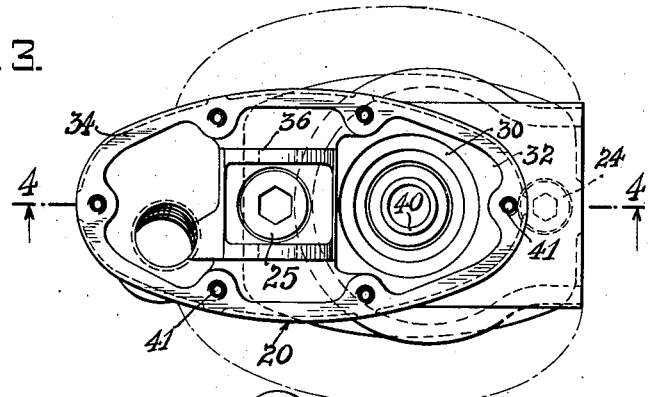
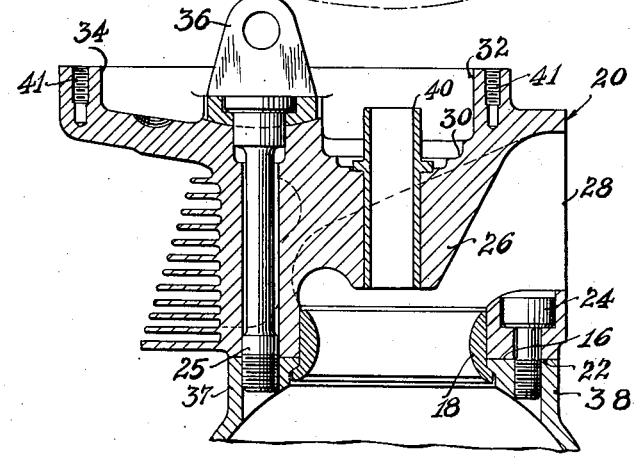
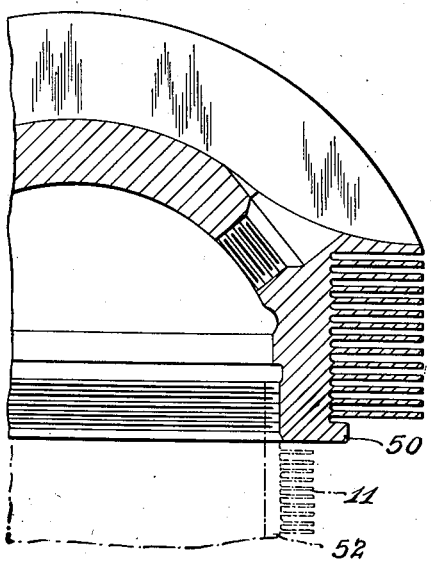
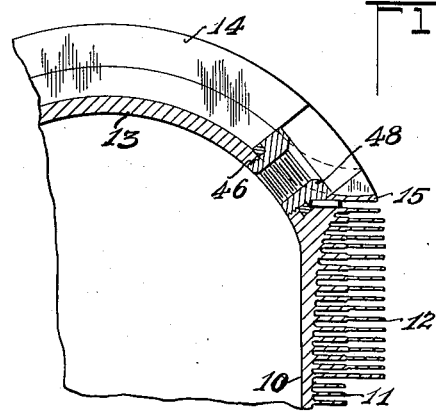
INVENTOR
RUDOLPH DAUB
BY
ATTORNEY Patented May 7, 1940

2,199,619

UNITED STATES PATENT OFFICE 2,199,619

COMPOSITE CYLINDER AND HEAD

Rudolph Daub, Paterson, N. J., assignor to Wright Aeronautical Corporation, a corporation of New York Application August 25, 1938, Serial No. 226,629

14 Claims. (Cl. 123—193)

This invention relates to improvements in the mode of construction of cylinders for internal combustion engines, the improvements herein disclosed being particularly suitable for use on air-cooled aircraft engines.

Current types of aircraft engine cylinders consist of a steel barrel having cooling fins turned thereon, and a cast cylinder head screwed to the barrel, the cylinder head carrying the valve seats, spark plug bushings, valve stem guides and means for mounting valve gear, such as rocker arms. The cast head arrangement has been a practical solution for the cylinder problem so long as the cylinder bore and the brake mean pressure of the engine are moderate. With increase in engine power, the brake mean pressure must necessarily be increased, which introduce a decrease in proportional cooling area and difficulty in obtaining sufficient strength in the cylinder head and its joint to the cylinder. The cast structure of the conventional cylinder head is definitely limited as to its strength, and numerous efforts have been made to construct composite cylinder heads in which the head per se is either integral with the cylinder, or is made of stronger material to sustain increased loads. In the former case, great difficulty is experienced in providing the complex forms of valve ports, guides and seats, while in the latter case, an undesirable gain in weight, without outstanding improvement, accrues. In the present invention I contemplate the use of an all steel cylinder with an integral head portion, the valve seats being formed in the integral head. The valve carrying structures, however, are separate from the cylinder and may be attached thereto by a form of joint which assures a tight seal with the cylinder head. The valve housing structure may be a casting, the casting process lending itself to the complex shapes essential to this structure. The cylinder itself, however, may be fabricated from a forging by simple machining operations so that the resultant cylinder assembly has great strength and minimum weight.

The objects of the invention may be adduced from the above remarks, and further comprise the provision of a composite cylinder structure wherein cast valve housings are attached to an integral cylinder through means of bolts and a cylindrical seat between the cylinder and housing.

Further objects will be apparent from a reading of the annexed specification and claims, together with an examination of the attached drawings, in which:

Fig. 1 is an elevation of the upper portion of a cylinder according to the invention;

Fig. 2 is an axial section through the cylinder;

Fig. 3 is a plan of one of the valve housings including a rocker box;

Fig. 4 is a section on the line 4—4 of Fig. 3;

Fig. 5 is a fragmentary section on the line 5—5 of Fig. 2; and

Fig. 6 is a section, similar to Fig. 5, showing an alternative arrangement of the invention in which a separate forged cylinder head is screwed to a cylinder sleeve.

In Figs. 1 to 5 inclusive, a steel cylinder 10 is provided with integral turned fins 11 in its lower portion and integral deep fins 12 turned in its upper portion. The cylinder carries an integral head 13 of more or less semi-spherical shape, on the exterior of which pompadour fins 14 are milled or otherwise formed in the central portion, as shown in Figs. 1 and 2. These fins may be formed to terminate as at 15 adjacent to the top turned fin 12. Each segment of the head 13 between the pompadour fins 14 and the turned fins 12 is milled with a cylindrical groove 16, the axis of which is normal to the cylinder axis and the axes of the grooves being parallel. Centrally of the grooves 16, angled valve ports 17 are formed within which valve seats 18 are inserted, these seats 18 projecting as bushings behind the surface contour of the grooves 16. This arrangement provides maximum fin area with simple machining operations.

Valve housings indicated in their entirety as 20 are formed as castings of light alloy, and are provided with integral cooling fins 21 and with a lower convex cylindrical surface 22 conformed to the shape of the cylindrical groove 16. The radius of the cylindrical surface 22 is preferably slightly greater than the radius of the groove 16 so that, when the member 20 is clamped to the cylinder head by screws 24 and 25 lying in the plane of symmetry of the member 20, the central portions of the cylindrical face 22 are pulled down into intimate contact with the central portion of the groove 16, the edges of the grooves and surface likewise being held in intimate contact by the elasticity of the materials used. The member 20 is formed with a valve guide boss 26 concentric with the valve seat 18, defining a valve port 27 through which gases may pass to or from the cylinder through an opening 28 to which an intake pipe or an exhaust pipe may be bolted in the conventional manner, according to whether the housing 20 is an intake or an exhaust assembly. The member 20 is likewise formed with spring seats 30 and a box 32, part of which extends to one side of the cylinder as at 34 to comprise a rocker box. A rocker arm, not shown, is adapted to be mounted upon a rocker bearing 36 seated upon an outwardly facing surface of the member 20, the rocker bearing being held in position by the bolt 25 which extends through the member 20 and engages a boss 37 in the cylinder head. The screw 24 likewise passes through a portion of the member 20, as shown in Fig. 4, engaging a boss 38 formed in the cylinder head.

A valve guide 40, according to conventional practice, is shown as being assembled in the valve guide boss 26.

It will be appreciated from the foregoing that all explosion loads in the cylinder are taken by the integral cylinder structure per se, the valve housing units 20 being relatively unstressed, and yet being mounted upon the cylinder in such a manner that a firm structural joint is afforded which is free from leakage. Rocker arm loads imposed by the valve springs and by the conventional rocker arm push rod mechanism are carried directly from the rocker arm bearing unit 36 to the cylinder head through the screw 25, so that even rocker arm loads are assumed by the strong steel cylinder structure rather than by the cast valve housing. The rocker box 32, 34 is provided with a flat upper face upon which a rocker box cover may be assembled and secured by screws engaging threaded openings 41.

A further advantage accrues in this structure in that the integral cylinder and head assembly may be readily machined and may be so formed that the thickness of the cylinder and head portions may be held to a similar dimensional order, obviating localized stresses due to differential web thicknesses. Since the finned valve housings are in close thermal contact with the cylinder at the grooves or saddles therein, they form an effective means for radiating heat from those parts of the cylinder which are not provided with fins. As to the steel cylinder 10, the fins 11, 12 and 14 need not necessarily be machined from integral material but may be applied by brazing or welding in any convenient manner.

In the initial formation of the forging which is to comprise a cylinder barrel and head unit, the forging may be provided with recessed portions indicated at 42, and bosses 44 to which cowling and the like may be attached. If these recesses are initially formed in the forging it will be unnecessary to machine them subsequently, the material thickness at this location being non-critical. Spark plug openings 46 are formed through the cylinder head at opposite ends of the pompadour fins, into which openings conventional bushings 48 may be inserted.

In Fig. 6 is shown a cylinder head 50 indicated as being in screw-threaded engagement with a conventional finned cylinder barrel 52. The head 50 partakes of the circumferential and pompadour fin arrangement of the first described arrangement, whereby the head may readily be machined from a forging of Duralumin or the like, which material is superior in mechanical properties to the cast material conventionally used. So far as the head 50 is concerned, it is provided with the cylindrical grooves 16 described in connection with the other figures, and valve housing units 20 are to be attached thereto in the manner previously described. The showing of Fig. 6 is merely an alternative arrangement of cylinder and head construction adapted for use with the principal provisions of the invention which include the valve housings 20 attached to the cylinder head, the mating surfaces of the housing and head being cylindrical in shape.

Referring briefly to Fig. 2, the separate cast valve housing structures 20 are formed with skirt portions 54 cast integral therewith and with the lowermost horizontal fin 55 thereof, these skirt portions providing baffle elements embracing the cylinder fins 11 and 12 by which cooling airflow around the cylinder is confined to the inter-fin spaces. Similarly, a baffle 56 is cast integral with one of the vertical fins 21 of one of the valve housings 20 to bridge the space between the vertical fins of the opposed housings 20, thus forming an integral obstruction to free airflow over the top of the cylinder and confining said airflow to the spaces between the pompadour fins 14 formed in the cylinder head 13. The elements 54 and 56 are adapted to cooperate with the conventional type of engine baffling utilized on radial air cooling engines by which airflow is confined to the inter-fin spaces of the engine cylinders.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. A composite internal combustion engine cylinder comprising a cylinder member having an integral domed head the head having a groove of cylindrical form thereacross and a valve opening through the central part of the groove to the cylinder interior, a valve housing of different material than the cylinder having a cylindrical bottom portion complementary to and fitted to said head groove, the valve housing having a valve port and a guide concentric with said valve opening, and means comprising bolts passing through the housing and engaging the cylinder head for attaching the housing to the head.

2. A composite internal combustion engine cylinder comprising a cylinder member having an integral domed head, the head having a groove of cylindrical form thereacross and a valve opening through the central part of the groove to the cylinder interior, a valve housing of different material than the cylinder having a cylindrical bottom portion complementary to and fitted to said head groove, the valve housing having a valve port and a guide concentric with said valve opening, and means comprising bolts passing through the housing and engaging the cylinder head for attaching the housing to the head, said bolts lying in a plane containing substantially the mid-element of said cylindrical groove.

3. A composite internal combustion engine cylinder comprising a cylinder member having an integral domed head, the head having a groove of cylindrical form thereacross and a valve opening through the central part of the groove to the cylinder interior, a valve housing of different material than the cylinder having a cylindrical bottom portion complementary to and fitted to said head groove, the valve housing having a valve port and a guide concentric with said valve opening, and means comprising bolts passing through the housing and engaging the cylinder head for attaching the housing to the head, and a rocker bearing in said housing anchored by one of said bolts.

4. A composite internal combustion engine cylinder comprising a cylinder member having an integral domed head, the head having a groove of cylindrical form thereacross and a valve opening through the central part of the groove to the cylinder interior, a valve housing of different material than the cylinder having a cylindrical bottom portion complementary to and fitted to said head groove, the valve housing having a valve port and a guide concentric with said valve opening, and means comprising bolts passing through the housing and engaging the cylinder head for attaching the housing to the head, said cylinder groove and cylindrical housing side portion being respectively struck on smaller and larger radii to effect an enforced full bearing therebetween upon tightening of said bolts.

5. A composite internal combustion engine cylinder comprising a cylinder member having an integral domed head, the head having a groove of cylindrical form thereacross and a valve opening through the central part of the groove to the cylinder interior, a valve housing of different material than the cylinder having a cylindrical bottom and fitted to said head groove, the valve housing having a valve port and a guide concentric with said valve opening, means comprising bolts passing through the housing and engaging the cylinder head for attaching the housing to the head, and an annular valve seat element engaging the cylinder and housing valve openings and piloting the housing relative to the cylinder.

6. A composite internal combustion engine cylinder comprising a cylinder member having integral circumferential fins and an integral domed head, the head having spaced grooves of cylindrical form thereacross and having vertical fins extending over the top of the head between said grooves, a valve housing of material different from the head having a cylindrical bottom portion fitted to each groove, said housings and head having concentric openings defining valve seats, said housings having means therein for the guiding of valves and the accommodation of valve gear, and cooling fins integral with said valve housings.

7. A composite internal combustion engine cylinder comprising a cylinder member having integral circumferential fins and an integral domed head, the head having spaced grooves of cylindrical form thereacross and having vertical fins extending over the top of the head between said grooves, a valve housing of material different from the head having a cylindrical bottom portion fitted to each groove, said housings and head having concentric openings defining valve seats, said housings having means therein for the guiding of valves and the accommodation of valve gear, cooling fins integral with said valve housings, and skirts integral with said housings overlapping certain of the fins of said cylinder and head.

8. A composite internal combustion engine cylinder head comprising a cylindrical portion having external circumferential fins formed thereon and an integral domed head portion having vertical fins extending across the head mid-portion, the head sectors between said vertical and circumferential fins having smooth faces formed thereon and valve openings through the head centrally of said faces, the head having a relatively uniform thickness throughout; valve housing units including valve ports communicating with said valve openings, having faces engaging said smooth head faces, and means securing said valve housings to said head.

9. A cylinder head assembly for an internal combustion engine comprising a head having a concave groove thereacross, a valve housing fitted to said groove and means securing the housing to the head, said housing and head having registering valve openings substantially centrally of the fitted portions thereof.

10. A cylinder head assembly for an internal combustion engine comprising a head having a concave groove thereacross, a valve housing fitted to said groove and means securing the housing to the head, said housing and head having registering valve openings substantially centrally of the fitted portions thereof, and means securing the housing to the head along substantially a mid-element of said grooves.

11. A cylinder head assembly for an internal combustion engine comprising a head having a concave groove thereacross, a valve housing fitted to said groove and means securing the housing to the head, said housing and head having registering valve openings substantially centrally of the fitted portions thereof, and a bushing comprising a valve seat engaging said openings and piloting the housing with respect to the head.

12. In an air-cooled internal combustion engine cylinder a first plurality of cooling fins thereon, a second plurality of fins thereon extending outwardly beyond the first set, and a masking baffle integral with one of the fins of the second plurality overlying the fins of the first plurality.

13. In an air-cooled internal combustion engine cylinder having a plurality of cooling fins thereon, a protuberance on the cylinder projecting beyond the envelope of the outer fin ends, and a baffle element integral with said protuberance overlying said fins and profiled substantially to their envelope.

14. In an internal combustion engine cylinder having a plurality of cooling fins thereon, an element adjacent said fins forming part of the cylinder assembly, and a baffle integral with said element overlying the edges of said fins and conformed in profile to the fin edge envelope.

RUDOLPH DAUB.